T. NAGEL.
CHANGE SPEED GEAR.
APPLICATION FILED OCT. 25, 1917.

1,268,140.

Patented June 4, 1918.
4 SHEETS—SHEET 1.

Witnesses.
Porter H. Flautt.
Alice J. Onyan

Inventor
Theodore Nagel
By Edwin P. Samuels
Attorney

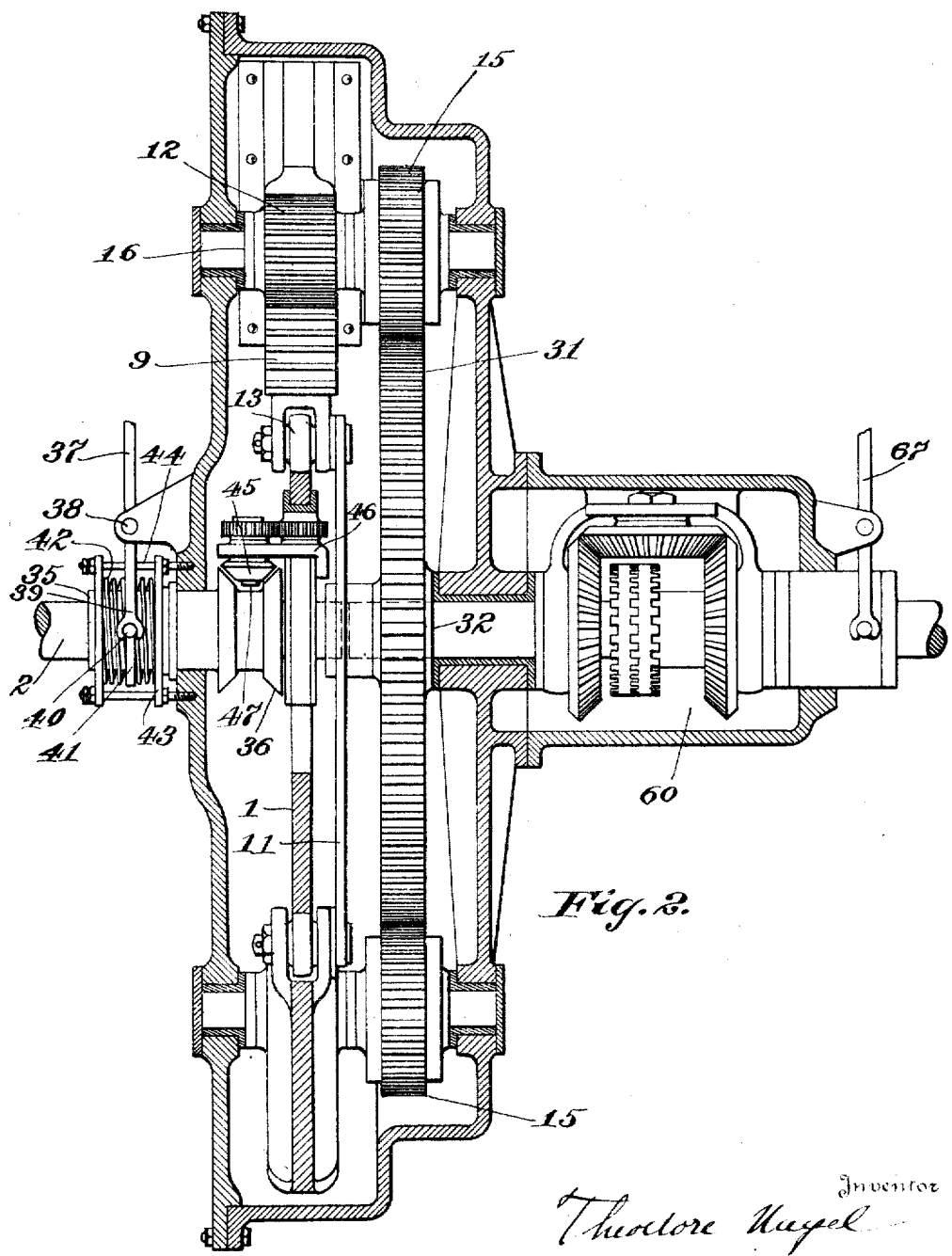

T. NAGEL.
CHANGE SPEED GEAR.
APPLICATION FILED OCT. 25, 1917.

1,268,140.

Patented June 4, 1918.
4 SHEETS—SHEET 3.

Witnesses
Porter H. Flautt
Alice G. Donyon

Inventor
Theodore Nagel
By Edwin H. Samuels
Attorney

T. NAGEL.
CHANGE SPEED GEAR.
APPLICATION FILED OCT. 25, 1917.
1,268,140.
Patented June 4, 1918.
4 SHEETS—SHEET 4.
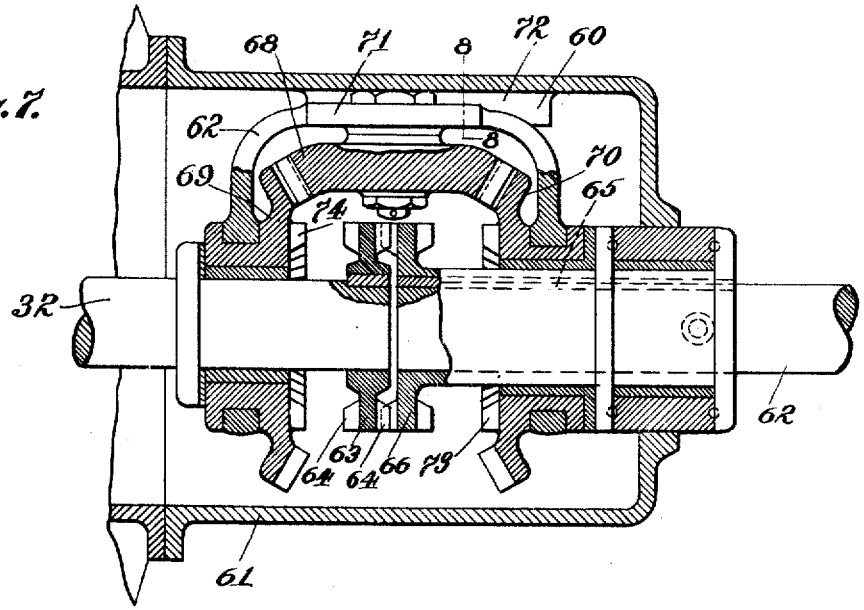
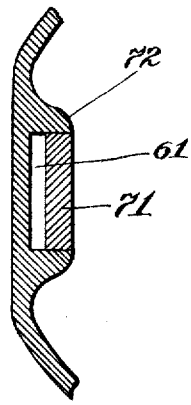
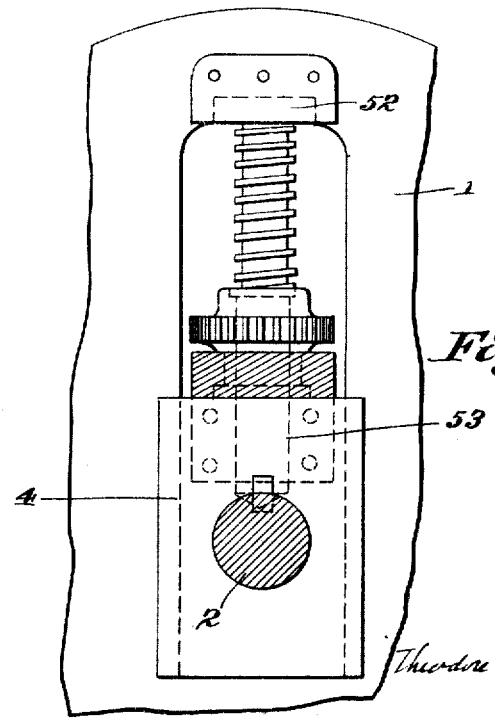
Witnesses.
Porter H. Flautt.
Alice G. Donegan
Inventor
Theodore Nagel
By Edwin K. Samuels
Attorney

UNITED STATES PATENT OFFICE.

THEODORE NAGEL, OF ARLINGTON, MARYLAND.

CHANGE-SPEED GEAR.

1,268,140.　　　　Specification of Letters Patent.　　Patented June 4, 1918.

Application filed October 25, 1917. Serial No. 198,426.

*To all whom it may concern:*

Be it known that I, THEODORE NAGEL, a citizen of the United States of America, residing in Arlington, Baltimore county, Maryland, have invented certain new and useful Improvements in Change-Speed Gear, of which the following is a specification.

The necessity for changing the speed ratio between the engine shaft and the rear axle or driving wheels in the various self-propelled vehicles as automobiles, trucks, tractors and the like is well-known. The engine at a given speed generates a substantially fixed amount of power and in order to change the tractile force exerted, it is necessary to change the speed ratio between the engine shaft and the driving wheels. It is also well-known that a certain type of change speed gear, called a sliding gear transmission, is almost universally adopted, exceptions being in favor of the roller and disk transmission. With both of these it is necessary to release the clutch, *i. e.*, to throw the engine out of gear in order to change the speed ratio, or, in common parlance, to "change gears," and with this apparatus a considerable amount of practice and skill on the part of the operator are necessary, first in order to operate at all, and second, in order to operate without injury to the machine. Also, as there are only two or three, or at the most four, different speeds, the change from each gear ratio to the next is so sudden as to produce a very noticeable jump or quick acceleration of the vehicle when the clutch is dropped in after each change. This jump results in a correspondingly considerable and unnecessary wear on the tires and strain on the bearings, gears and other parts.

While the transmission or gear combination which is the subject of this application, may be utilized in various connections, it has been developed as an automobile transmission and this will probably prove to be its best use in the arts; therefore, it will be so described.

Broadly considered, the object is to produce a gear combination which will operate to transmit from a driving to a driven shaft any desired speed ratio and permit the change of the speed ratio without disengaging the driving or driven shafts, the number of possible speed ratios or changes of speed ratio between certain limits being infinite so that the speed changes are gradual and there is no jumping or sudden change from any speed ratio to another widely different speed ratio.

More definitely, my mechanism is designed to transmit any relative speed desired from a driving to a driven shaft and to accomplish the change of speed ratio without altering the speed of the driving shaft and without disengaging the driving shaft from the transmission mechanism or from the driven shaft while altering the speed of the driven shaft.

The apparatus consists of a cam, receiving rotation from the driving shaft, with means for shifting the eccentricity of the cam to any position or intermediate position from zero to maximum throw, by which means is obtained a variation of the amount of linear or reciprocating motion resulting from the cam action, the same being transformed into motion of rotation to be applied to the driven shaft. By varying the stroke of the cam, the speed ratio is correspondingly changed.

In the form of the invention shown, the rectilinear reciprocating motion is transformed to rotary motion by means of a plurality of racks and coöperating pinions, the oscillating or rotary reciprocating motion of each pinion being in turn transformed to intermittent rotary impulses in a single direction by a combination of ratchet and pawl mechanism for each pinion and the intermittent impulses are in turn transformed into a continuous rotary drive by combining the rotary motion thus derived from the reciprocation of each of two or more racks.

In the accompanying drawings I have illustrated a transmission device constructed in accordance with my invention, in which drawings, Figure 1 is a view taken in a plane transverse to the driving shaft, showing the gear casing in cross-section and the cam racks and gears in plan;

Fig. 2 is a view taken at right angles to the plane of Fig. 1 showing the casing and the cam in section, and the gears in elevation;

Fig. 6 is a view of the mechanism shown in Fig. 5 taken at right angles to the plane of that figure;

Fig. 7 is a section through the reverse gear casing showing the reverse gears, the same being taken in a plane of the driving shaft, etc., and Fig. 8 is a section on the line 8, 8 of Fig. 7.

Figure 1:
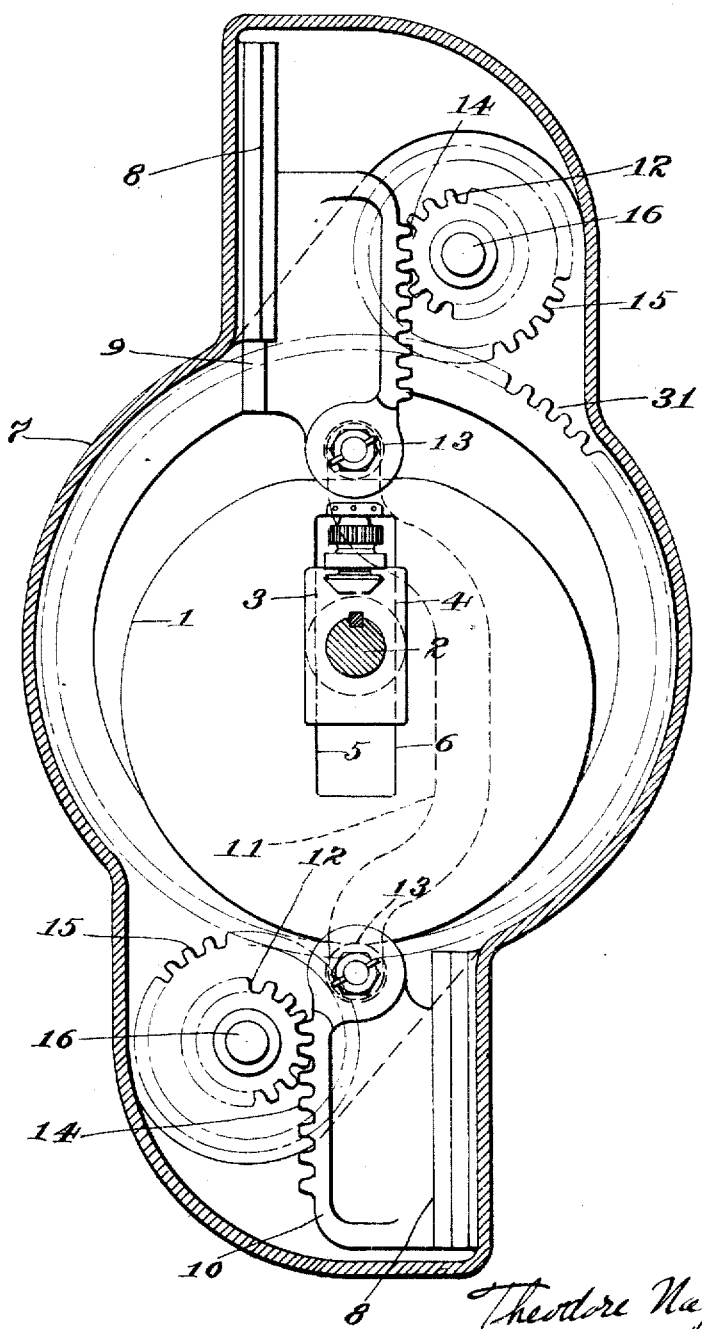

Referring to the drawings by numerals, the mechanism includes a cam 1 adjustably mounted on the drive or engine shaft 2. In the form of the invention shown, the adjustment or means of mounting the cam includes a block 3 keyed to the shaft or otherwise fastened to rotate with the shaft, the same being provided with guide ways 4 to be engaged by the edges or walls 5 of a slot 6 in the cam 1 which, as shown, is alined with the axis of symmetry of the cam, the same being preferably what is termed a uniform advancement cam, *i. e.*, one the working surface of which is made up from the curves of uniform advancement of all the eccentricities from zero up to maximum throw, the neutral axis and axis of maximum throw of course being on the center line of the slot. The illustration includes a casing 7 provided with guide ways 8 at right angles to the engine or drive shaft 2; these as shown are parallel to each other. Reciprocating in these guides are sliding racks 9, 10, on opposite sides of the drive shaft and connected by suitable means as a rod 11.

These racks are actuated by the cam 1 through cam followers 13. Each of the racks 9, 10 is provided with teeth 14 and the teeth of each rack mesh with those of a corresponding gear 12 keyed to a shaft or stud 16 journaled in the casing 7 and parallel to the drive shaft 2. On each shaft 16 there is mounted a floating gear 15. The teeth 15' of gears 15 are, as shown, formed on rings 18 mounted between and secured to disks 19, one on each side of the ring, which turn freely on bearings 16' on the shaft or stud 16, and each ring 18, as illustrated, is provided with internal ratchet teeth 20. Keyed to each shaft or stud 16 inside the casing formed by the gear ring 18 and the disks 19 is a smaller ratchet 21; the diameters of the annular ratchet 20 on the inside of the ring and the small or inside ratchet 21 are so related as to leave between them an annular space 22 bounded by rings of oppositely disposed pawl teeth 20 and 21. The annular space 22 is herein termed a pawl race. In this race are mounted pawls 23, each on a transverse stud 24 to which is rigidly secured on each end, in the form of the invention shown, a gear 25. Each gear 25 meshes with an annulus or internally toothed ring 26 secured to the gear ring 18, the toothed rings 26 being, in the form of the invention shown, secured each between the ring 18 and one of the coöperating disks 19, the central ring 18 with the ring 26 on each side and a disk 19 covering each ring being, as shown, fastened together by rivets or pins 27. The gears 25 also mesh with gears 28 secured to the ratchet 21 on each side of the same. Each floating gear 15 meshes with the large gear 31 keyed or otherwise rigidly secured to the driven shaft 32.

Figure 5:
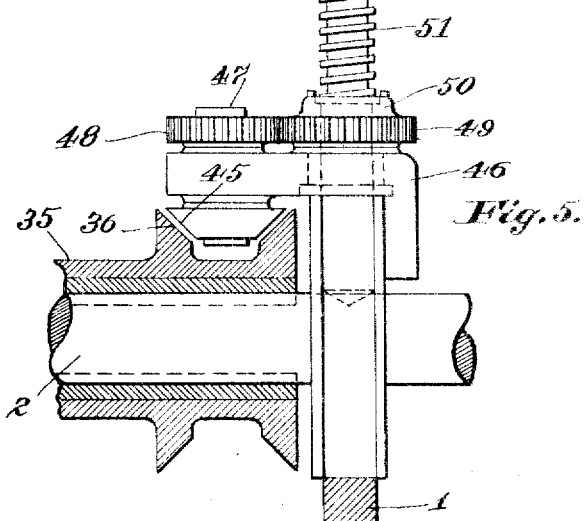
Fig. 5 is a view of the mechanism for changing the eccentricity of the cam.

Referring to Fig. 2 and Fig. 5, it will be noted that there is a sliding sleeve 35 keyed to the drive shaft 2 at the left of the cam. This sleeve carries oppositely disposed beveled or conical friction surfaces 36. The position of these beveled friction surfaces is controlled by lever 37 pivoted at 38 on the casing and forked at its end to straddle the sleeve. This lever has jaws 39 inclosing pins 40 secured to the sleeve. These may be mounted on a flange 41 which serves as an abutment for springs 42 which also engage the apertured plates 43 and tend to keep the sleeve in central or neutral position, the plates being mounted on the casing by means of bolts 44 or in any other convenient manner. Between the beveled friction surfaces 36 and normally out of contact with both said surfaces, there is a beveled roller 45 having its axis at right angles to that of the drive shaft. This beveled roller is mounted on a bracket 46 carried by the block 4 on which the cam 1 is mounted to slide, as already described. Secured to the shaft 47 which carries the beveled roller 45 is a gear 48 meshing with a gear 49 formed with a nut 50 which coöperates with a screw 51 fastened to the cam at 52, see Fig. 6, and having a socket 53 in the block so that it can enter the block.

Any suitable reverse gear may be used with the change speed mechanism described, and for example I have illustrated a gear of this type, the same being shown in Fig. 7. The reverse gear is indicated in a general way by reference character 60 and is inclosed in a casing 61 secured to the transmission casing. The driven shaft 32 terminates at the central portion of the reverse gear and in alinement with it is a shaft 62 known as the second driven shaft. On the end of the driven shaft 32 is keyed or otherwise suitably secured a collar 63 having radially extending and circumferentially spaced lugs 64 on each face. The second driven shaft 62 has keyed to it a sliding sleeve 65 having secured to its end adjacent the driven shaft a collar or flange 66 provided with lugs 64 similar to the lugs 64 on the collar 63 on the driven shaft 32. The sliding sleeve 65 is moved by means of a lever 67 and carries a set of three beveled gears 68, 69, 70, in a cage 71 sliding in ways 72 in the casing 61. By sliding the sleeve 65 to the right, the teeth 64 on the collar 66 are brought into engagement with corresponding teeth or lugs 73 on the beveled gear 70 and by further moving the sleeve, the entire cage is slid to the right bringing the teeth or lugs 74 on the beveled gear 69 into engagement with the teeth 64 on the collar 63.

Normally as shown, the shafts 32 and 62 are connected by the lugs 64 and run in the same direction but when it is desired to reverse, the operation just described incident to sliding the sleeve 65 is effected by means of the lever 67, and through the beveled gears, the second shaft 62 is caused to rotate oppositely to the driven shaft 32.

In the operation of the change speed or transmission gearing, referring first to Fig. 1, the cam 1 rotates with the engine or drive shaft 2 causing a reciprocation of the racks 9, 10, the throw or stroke of the racks varying with the eccentricity of the cam which is changed at the will of the operator as hereinafter described. The racks 9, 10 mesh with the corresponding pinions or gears 12 and impart to the shafts 16 an oscillation the extent of which varies with the length of the stroke of the racks and hence with the eccentricity of the cam 1.

Figure 4:
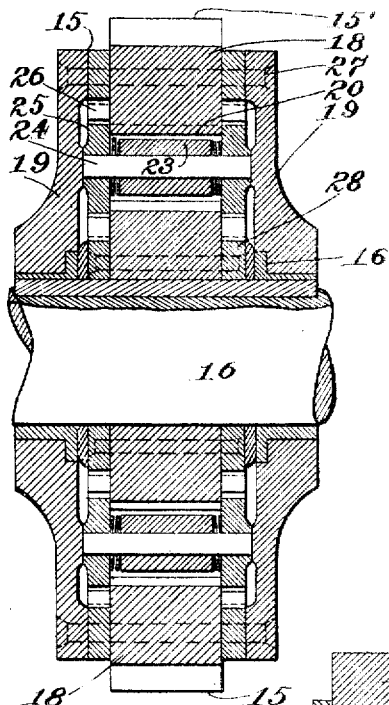
Fig. 4 is a section on the line 4, 4 of Fig. 3.
Figure 3:
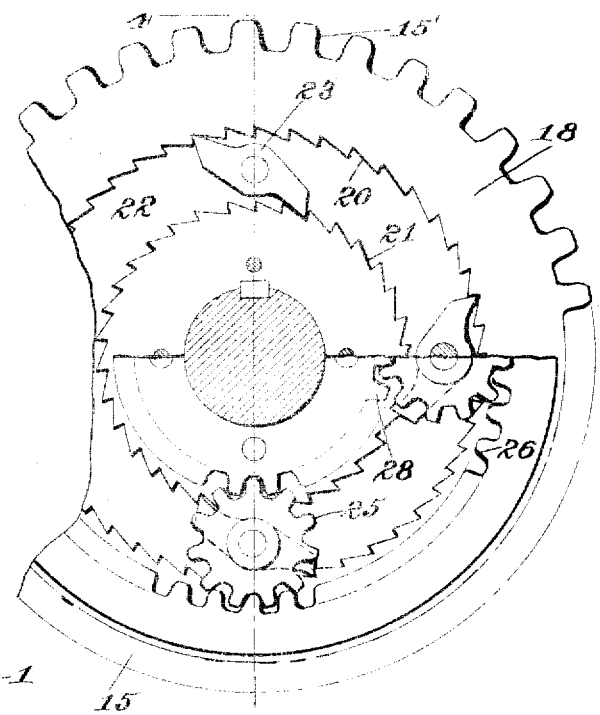
Fig. 3 is a view taken in a plane parallel to the plane of Fig. 1 showing the mechanism combined with one pinion for translating the oscillating motion derived by the pinion from the rack to rotary impulses in one direction.

Referring now to Figs. 3 and 4, showing the gear 15 as a ring having internal ratchet teeth 20 coöperating with the teeth of the smaller ratchet 21 to form a pawl race 22 in which are the pawls 23 mounted on the pinions 25 which are engaged by the internal gears 26 and the smaller gears 28 on the ratchet 21, it is apparent that on the forward or outward stroke of each rack 9, 10, the pawls 23 controlled by their gears 25 will engage at one end the teeth 20 of the ring 18, and at the other end, the teeth of the small ratchet 21, which latter is keyed or otherwise rigidly secured to the shaft 16 as shown in Fig. 3. Thus a rotary impulse is imparted at each forward or outward stroke of the corresponding rack 9 or 10 to the pinions 15 meshing with the big gear 31 on the driven shaft 32. It is also evident from examination of Fig. 1 that as one rack completes its outward stroke, the other starts the corresponding stroke and at the termination of the outward stroke of each rack, i. e. the change of direction of the stroke, there is a simultaneous change of direction of the rotation of the corresponding shaft 16, which by operation of the teeth 26 and 28 on the pawl carrying gears or pinions 25, causes an immediate release of the pawls. Simultaneously the other rack is changing its direction and the pawls in the corresponding floating pinion 15 are caused by the reverse action of the teeth 26 and 28 on the pinions 25 to engage on both sides of the race 22 so that in effect the rotary impulse transmitted by the rack 10 through the corresponding pinion 12, shaft 16 and floating pinion 15 to the big gear 31 is immediately added to the impulse just transmitted by the rack 9 through the pinion 12, shaft 16 and the corresponding floating pinion 15 to the same big gear 31. In this way, a smooth and continuous rotary drive with an even and unvarying impulse resulting from the oscillation of the racks caused by the rotation of the cam 1 is set up and applied to the driven shaft 32 which carries the big gear 31.

An important feature of the present invention is that which enables the operator to change the speed ratio at any time without disconnecting the driving from the driven shaft and makes it impossible to change the speed ratio so suddenly as to strain or break the parts owing to the fact of such change of speed ratio. This consists in the means for varying the eccentricity of the cam to the shaft 2 gradually and at the will of the operator. To this end, the beveled friction surfaces 36 on the sleeve 35 are provided, the same coöperating with the beveled roller 45 and driving through the train 48, 49, the nut 50 swiveled in the bracket 46 engaging the screw 51 which is rigidly attached to the cam and serves to move the latter relatively to the shaft 2, varying the eccentricity of the cam. To control the speed, the operator merely moves the lever 37 to the faster or slower position as indicated on a suitable dial or plate, the springs 42 serving to normally keep the beveled friction surfaces 36 out of mesh with the roller 45. When the sleeve 35 is moved in one direction from neutral position, one of the beveled friction rollers 36 is brought into contact with the roller 45 rotating the gears and nut and hence, moving the cam in one direction, i. e., increasing or decreasing its eccentricity, and when the lever is moved into the opposite position bringing the other beveled roller 36 into contact with the beveled roller 45, the train of gears and the nut are rotated in the opposite direction, changing the eccentricity of the cam in the opposite direction, i. e., in the middle position of the lever 37, the speed remains constant, moved to one side, the speed ratio gradually increases, and moved to the other side, the speed ratio gradually decreases, for it is to be clearly understood that the speed ratio is in the present device merely a function of the eccentricity of the cam varying directly with that quantity.

The device described consists in a change speed gear for transmitting rotation from a driving to a driven shaft at any speed ratio without altering the speed of the driving shaft and without disengaging the driving or driven shaft from the load, the same including means for producing reciprocating motion and means for varying the extent of said motion, means for changing the reciprocating motion to rotary impulses in a single direction, and means for adding these impulses together to produce continuous rotary motion, the change speed element being the means for varying the throw or extent of reciprocation.

A device embodying the invention in what is at present the preferred form has been described in minute detail in order that the nature and operation of the invention may be clearly understood; however, the specific terms herein are used descriptively and not in their limiting sense. A wide range of equivalent or quasi-equivalent elements and mechanical means may be substituted without departure from the spirit of the invention, the scope of which is defined in the claims.

What I claim and desire to secure by Letters Patent is:

1. A change speed gear operating to transmit rotary motion from a driving to a driven shaft and to vary the speed ratio at the will of the operator consisting of a cam on the driving shaft, means for varying the throw of the cam gradually while the driving shaft rotates, a plurality of followers engaging the cam, means for transforming the reciprocating motion of each follower to rotary impulses in a single direction, and means for combining the impulses to apply a continuous direct torque to the driven shaft.

2. A device for transmitting rotary motion from a rotating driving member to a driven member and varying the speed ratio at the will of the operator, consisting of a plurality of reciprocating elements, means for imparting reciprocating motion at a uniform speed throughout the path of said motion to said elements from said rotary member, means for varying the extent of the path of reciprocation at will, means for transforming the reciprocating motion of each such reciprocating element to rotary impulses in a single direction, and means for combining or adding the impulses imparted by the plurality of reciprocating members together to apply continuous torque to the driven shaft.

3. A device for transmitting rotary motion from a rotary driving element to a driven element, varying the speed ratio at the will of the operator, consisting of a plurality of reciprocating elements, means for actuating them from the driving element to move in a rectilinear path at a uniform speed throughout said path, means for varying the length of the path of reciprocation gradually at will, means for transforming one-half of each reciprocating stroke to a rotary impulse, and means for combining the rotary impulses thus derived from the reciprocating elements, applying continuous torque to the driven element.

4. A change speed gear operating to transmit rotary motion from a rotary driving to a driven element and to vary the speed ratio at the will of the operator, consisting of a cam of uniform advancement with means for shifting the cam gradually at right angles to its axis, a plurality of cam followers, means for transforming the forward stroke of each reciprocation of each follower to a rotary impulse, and means for adding the rotary impulses end to end, thus applying continuous torque to the driven element.

5. In a change speed gear operating to transmit rotary motion from a driving to a driven element and to vary the speed ratio at the will of the operator, consisting of a cam member on one element, means for shifting the same in a direction transverse to its axis, reciprocating followers driven by the cam, a rack reciprocated by each follower, an oscillating pinion engaged by each rack, a ratchet and pawl mechanism for each pinion which receives a rotary impulse from the forward stroke of each oscillation of the oscillating pinion, and a gear connected to said ratchet and pawl mechanism and meshing with a gear on the other said element.

6. In combination with two shafts, a change speed mechanism consisting of a cam on one shaft, a gear on the other shaft, means for shifting the cam to vary its eccentricity, a plurality of followers for the cam, a rack driven by each follower, a pinion driven by each rack, a shaft for each pinion, a floating pinion including ratchet and pawl mechanism to transmit the forward stroke of the oscillation of each pinion, the floating pinions meshing with the said gear on the other shaft.

7. A change speed mechanism for transforming rotation from a driving to a driven element and varying the speed ratio between said driving and driven element, a cam on one element, means for shifting the eccentricity of the cam, followers for the cam, a reciprocating rack for each follower, a pinion with ratchet and pawl mechanism for each rack, a shaft for each pinion, a second pinion on each said shaft, controlled by said ratchet and pawl mechanism, and a gear on the other rotating element, each of said latter pinions meshing with the gear.

8. A device for transmitting rotary motion from a driving to a driven element and varying the speed ratio at the will of the operator, consisting of a plurality of reciprocating elements, means for imparting reciprocating motion to said elements, means for transforming the reciprocating motion of each said reciprocating element to rotary impulses in a single direction, means for combining or adding the impulses together to apply continuous torque to the driven shaft, means for varying the extent of the path of reciprocation of the said reciprocating elements consisting of a sliding sleeve with a plurality of beveled members thereon, a revolving beveled member coöperating with either of the first said beveled members, a screw for varying the extent of said path of reciprocation, means connecting said last-mentioned beveled member to the screw, and means for operating said beveled member in either direction by shifting the sleeve to bring first one and then the other of the two beveled members on the sleeve in contact with it.

9. In a device for transmitting rotary motion from one rotary element to a second rotary element and varying the speed ratio at the will of the operator, consisting of said rotary elements, a plurality of reciprocating racks driven from one said element, means for varying the extent of the path of reciprocation of the racks, a pinion coöperating with each rack, a shaft for each pinion, means in connection with each said shaft for transmitting the forward impulse of each oscillation of said shaft to said second rotary element, consisting of a floating gear, a ratchet on the shaft, internally disposed ratchet teeth on the gear, a pawl coöperating with each set of ratchet teeth, a gear controlling each pawl, gear teeth carried by the pinion and gear teeth carried by the ratchet meshing with the pawl gear so that the pawl is shifted at each change of direction of the pinion, and a gear on the other rotary element with which all said floating gears mesh, adding the rotary impulses received from each rack.

10. A change speed gear for transmitting rotation from a driving to a driven shaft to furnish any speed ratio without altering the speed of the driving shaft and without disengaging the driving or driven shaft from the load, the same including means for producing reciprocating motion on a predetermined path at a uniform speed throughout said path, means for varying the length of the path of said reciprocating motion, means for changing the reciprocating to rotary impulses in a single direction, and means for adding these impulses together to produce continuous rotary motion, the said change speed element being the means for varying the extent or throw of reciprocation.

11. A change speed gear for transmitting rotary motion from a rotary driving element to a driven element to furnish any speed ratio without altering the speed of the driving element and without disengaging the driving or driven element from the load, the same consisting of a plurality of reciprocating members, means for imparting reciprocating motion to said members at a uniform speed throughout their path of motion, the members moving alternately in predetermined paths, means for varying the speed ratio by changing the length of the path of said reciprocating motion gradually without disconnecting the driving from the driven element, means for changing the reciprocating impulses of the different reciprocating members to rotary impulses in each instance, and means for adding these impulses together to produce continuous rotary motion of the driven element.

12. A change speed gear operating to transmit rotary motion from a driving to a driven shaft and to vary the speed ratio at the will of the operator, consisting of a cam of uniform advancement, means for varying the throw of the cam gradually while the driving shaft rotates, a plurality of cam followers, means for transforming the motion of the followers to rotary impulses, and means for combining the impulses to apply continuous torque to the driven shaft.

13. A change speed gear consisting of a cam of uniform advancement, means for rotating the cam, a plurality of racks each receiving uniform reciprocating motion from said cam, means for varying the throw of the cam gradually while it rotates, an oscillating pinion driven by each rack, ratchet and pawl mechanism for each pinion receiving a rotary impulse from the forward stroke of each oscillation of the oscillating pinion, a gear connected to said ratchet and pawl mechanism, and a gear meshing with each said latter gear and driven therefrom.

14. In combination with two shafts, a change speed mechanism consisting of a cam on one shaft, means for shifting the cam to vary its throw, two racks and means connecting the same to the cam so that they are driven thereby, a pinion oscillated by each rack, a floating pinion including ratchet and pawl mechanism with positive means for actuating the pawls at each change of direction of the rack to transmit the forward oscillations of the pinion to the floating pinion, and a gear on the second shaft meshing with the floating pinion.

Signed by me at New York, New York, this 20 day of October, 1917.

THEODORE NAGEL.

Witnesses:
E. H. THUFRO,
L. F. SCHADER.